(12) United States Patent
Kremer et al.

(10) Patent No.: US 7,596,054 B2
(45) Date of Patent: Sep. 29, 2009

(54) SUPPRESSED FEATURE WAVEFORM FOR MODULATED SONAR TRANSMISSION

(75) Inventors: Larry Kremer, Florissant, MO (US); John Ziegler, St. Louis, MO (US); Daniel J Goldkamp, St. Charles, MO (US); Richard Lindquist, St. Peters, MO (US)

(73) Assignee: DRS Sustainment Systems, Inc., St. Louis, MO (US)

( * ) Notice: Subject to any disclaimer, the term of this patent is extended or adjusted under 35 U.S.C. 154(b) by 153 days.

(21) Appl. No.: 11/266,545

(22) Filed: Nov. 3, 2005

(65) Prior Publication Data

US 2007/0097785 A1     May 3, 2007

Related U.S. Application Data

(60) Provisional application No. 60/624,687, filed on Nov. 3, 2004.

(51) Int. Cl.
*H04K 3/00* (2006.01)

(52) U.S. Cl. .......................................... 367/1; 367/137
(58) Field of Classification Search ................. 367/101, 367/137, 138, 1
See application file for complete search history.

(56) References Cited

U.S. PATENT DOCUMENTS

| | | | |
|---|---|---|---|
| 4,064,511 A | 12/1977 | Manfanovsky | |
| 4,439,845 A | 3/1984 | Geohegan, Jr. et al. | |
| 4,449,209 A | 5/1984 | Zehner et al. | |
| 4,697,254 A | 9/1987 | Pridham | |
| 4,706,093 A | 11/1987 | Groth, Jr. | |
| 5,012,452 A | 4/1991 | Johnson et al. | |
| 5,053,772 A | 10/1991 | Lamper et al. | |
| 5,055,850 A | 10/1991 | Lamper et al. | |
| 5,075,863 A | 12/1991 | Nagamune et al. | |
| 5,548,561 A | 8/1996 | Hussain et al. | |
| 5,719,579 A | 2/1998 | Torre et al. | |

(Continued)

OTHER PUBLICATIONS

Doppler-sensitive active sonar pulse designs for reverberation processing Collins, T. Atkins, P. Sch. of Electron. & Electr. Eng., Birmingham Univ.Radar, Sonar and Navigation, IEE Proceedings—Publication Date: Dec. 1988 vol. 145, On pp. 347-353 ISSN: 1350-2395 CODEN: IRSNE2 INSPEC AccessionNo. 61.*

*Primary Examiner*—Ian J Lobo
(74) *Attorney, Agent, or Firm*—Sonnenschein Nath & Rosenthal LLP

(57) ABSTRACT

A suppressed feature waveform sonar transmission is produced by modulating a carrier wave with a baseband waveform that is generated from a known pulse sequence. A waveform embodiment of the pulse sequence is modified to create interference among the primary lobes of the constituent waveforms that are representative of the individual pulses. The baseband waveform so created appears as noise, making the baseband waveform modulation of the sonar transmission difficult to detect without knowledge of the pulse sequence or baseband waveform structure. The sonar transmission can be analyzed by cross-correlating the received signal with the baseband waveform or the pulse sequence waveform. The pulse sequence is preferably a complementary sequence. Modification of the pulse sequence may be obtained by passing an embodiment of the pulse sequence through a bandpass filter. In such a modification, the bandpass filter is preferably overdriven by a pulse sequence waveform having a frequency that is about eight to about ten times the bandwidth of the filter.

11 Claims, 4 Drawing Sheets

U.S. PATENT DOCUMENTS

| | | |
|---|---|---|
| 5,861,834 A | 1/1999 | Sauer et al. |
| 6,128,249 A | 10/2000 | Sullivan |
| 6,466,515 B1 | 10/2002 | Alsup et al. |
| 6,714,481 B1 | 3/2004 | Katz et al. |
| 6,985,749 B2 * | 1/2006 | Bannasch et al. ........... 455/506 |
| 2007/0274152 A1 * | 11/2007 | Rees .............................. 367/7 |

* cited by examiner

SUPPRESSED FEATURE WAVEFORM FOR MODULATED SONAR TRANSMISSION

CROSS REFERENCE TO RELATED APPLICATIONS

This application claims priority to and claims the benefit of U.S. Provisional Patent Application 60/624,687, filed Nov. 3, 2004, which is wholly incorporated herein by reference.

BACKGROUND OF THE INVENTION

1. Field of the Invention

The invention generally provides a method and an assembly for the production and use of an encoded sonar waveform. More particularly, the invention provides a method and an apparatus that produces a modulated sonar pulse, wherein the baseband waveform modulating the pulse is encoded so as to resemble noise.

2. Description of Related Art

Particularly in a time of war or anytime when a vessel is attempting to use sonar to collect information about an adversary, it is often desired that one's use of an active sonar system not be detected by the adversary. While there are methods of reducing the adversary's ability to detect the carrier wave of a traditionally modulated sonar pulse (such as through power management, pulse compression, directivity of transducer array, and tactical techniques), more sophisticated detection methods and equipment are readily designed and built which, to a large extent, can overcome these obstacles to detection by detecting the structure of the modulation within the modulated carrier wave. The regular variation of the modulating waveform (baseband waveform) can be detected even, for example, at low transmit signal power levels. With the proper electronic equipment, traditional, linear frequency modulated (LFM) sonar transmissions, for example, are readily detectable due to the regular nature of the modulation (a linear frequency ramp). Such detection of traditional modulation is achieved with use of so-called feature detectors, such as $n^{th}$ law and delay and multiply detectors.

SUMMARY OF THE INVENTION

In light of the potential to fairly readily detect traditionally modulated sonar transmissions, advances in modulation waveform encoding are required to prevent the detection of an active sonar system by adversaries. In an embodiment of the present invention, the transmitted sonar wave is particularly difficult to detect because, in addition to traditional techniques for masking the modulated carrier wave, any features within the modulated carrier pulse have been concealed so that the pulse appears to contain no features, and instead appears to contain only noise. That is, the modulating waveform closely resembles noise. To obtain useful information from such a signal, a reflected sonar pulse must be decoded. Decoding is a well-understood process for systems in which the detector operates in conjunction with the transmitter. For feature detectors not associated with the transmitter, however, detection of such an encoded pulse is difficult, if not impossible.

In an embodiment of the present invention, a sonar transmission apparatus modulates a sonar carrier wave with a baseband waveform generated from a repeating, known sequence of pulses (a "pulse sequence"). Such a pulse sequence may be a set of sequences, such as a Welti-D complementary sequence pair. To generate the baseband waveform, a waveform embodiment of the pulse sequence is passed through a bandpass filter (also termed a pulse shaping filter), limiting the frequency band comprising the pulses of the pulse sequence waveform, and thereby increasing the pulse width, and otherwise changing the pulse shape (discussed in more detail below). This filtered pulse sequence represents a modification of the original pulse sequence waveform, which in its altered form is the baseband waveform used for modulation of the carrier wave. Where the frequency of the pulse sequence is sufficiently high as compared with the bandwidth of the bandpass filter, the increased pulse width resulting from the filtering causes interference among the primary lobes of the filtered pulses. The result of the interference is a baseband waveform that generally lacks any regular features, and thus resembles noise. Therefore, after modulation of the carrier wave with a baseband waveform so constructed, it is difficult to detect any features internal to the transmitted modulated carrier pulse, except through correlation with the pulse sequence. While essentially undetectable to independent feature detectors, the baseband waveform remains a separable component of the sonar transmission. Through demodulation of a reflected sonar signal by cross correlation with the baseband waveform or with the pulse sequence that is used to construct the baseband waveform, the information traditionally obtainable by modulated sonar investigation, including object distance, bearing, velocity, and size, is readily obtainable with the use of this system. Particularly beneficial is that many of the desirable properties associated with the complementary nature of a preferred sequence (e.g., Welti-D) are preserved through the feature suppression filtering.

An embodiment of the invention is a suppressed feature waveform sonar transmission comprising a carrier wave modulated by a baseband waveform that is the result of interference between primary lobes of a modified pulse sequence waveform. In an embodiment, the baseband waveform resembles noise. In an embodiment the pulse sequence waveform may be generated from a pulse sequence that is selected from one of a complementary pulse sequence, a Golay sequence, a Hadamard sequence, a Barker sequence, or a Welti sequence, which pulse sequence may be, in particular, a set of two or more sequences, from which a number of members of the set are selected and used independently to generate an equal number of baseband waveforms that are used in either a defined or a pseudo-random order to successively modulate portions of the carrier wave. Preferably such a pulse sequence manifests a complementary property, and the baseband waveform retains such complementary property.

Interference among primary lobes may be the result of a broadening of the pulse width of the pulses in the pulse sequence waveform. Such interference may be generated when the pulse sequence waveform is passed through a bandpass filter. In such a case, preferably the pulse sequence waveform is characterized by a frequency that is at least twice the value of the bandwidth passed by the bandpass filter. In an embodiment, the pulse sequence waveform is characterized by a frequency that is in the range from about eight to about ten times the value of the bandwidth passed by the bandpass filter.

In an embodiment, an advantage of a suppressed feature waveform sonar transmission as discussed herein is that the baseband waveform is essentially undetectable by a detector that is not provided with at least one of the pulse sequence waveform, the pulse sequence from which the pulse sequence waveform was generated, or the baseband waveform. Further alteration of the sonar transmission may include using at least one of the following techniques: power management, frequency diversification, directivity selection, or tactical techniques.

An alternate embodiment is a method for detecting information about physical objects using a suppressed feature waveform sonar transmission, comprising the steps of: providing a pulse sequence; generating a waveform embodiment of the pulse sequence; modifying the pulse sequence waveform to create a baseband waveform characterized by interference among the primary lobes of constituent waveforms representing each individual pulse as modified; modulating a carrier wave with the baseband waveform; and transmitting the modulated carrier wave as a suppressed feature waveform sonar transmission. Such a method may further comprise the step of cross-correlating a received signal from the transmission or a reflection of the transmission with the pulse sequence waveform or the baseband waveform. Such a method may include a pulse sequence selected from one of a complementary pulse sequence, a Golay sequence, a Hadamard sequence, a Barker sequence, or a Welti sequence. Preferably, the pulse sequence used in the method manifests a complementary property, and the baseband waveform retains the complementary property of the pulse sequence. In an embodiment of the method, the step of modifying comprises passing the waveform embodiment of the pulse sequence through a bandpass filter.

A further embodiment is an apparatus for transmitting a suppressed feature waveform sonar transmission comprising: a code generator for generating a pulse sequence waveform; a bandpass filter through which the pulse sequence waveform is passed when generating a baseband waveform; an oscillator for generating a carrier wave; and a modulator for modulating the carrier wave with the baseband waveform. Such an apparatus may further comprise a processor for cross-correlating a signal received as a reflection of the sonar transmission with at least one of the pulse sequence waveform or the baseband waveform. In such an apparatus the pulse sequence waveform may be generated from a pulse sequence that is selected from one of a complementary pulse sequence, a Golay sequence, a Hadamard sequence, a Barker sequence, or a Welti sequence. Preferably, the pulse sequence is characterized by a frequency that is at least twice the value of the bandwidth passed by the bandpass filter.

DETAILED DESCRIPTION OF PREFERRED EMBODIMENTS

Figure 1:
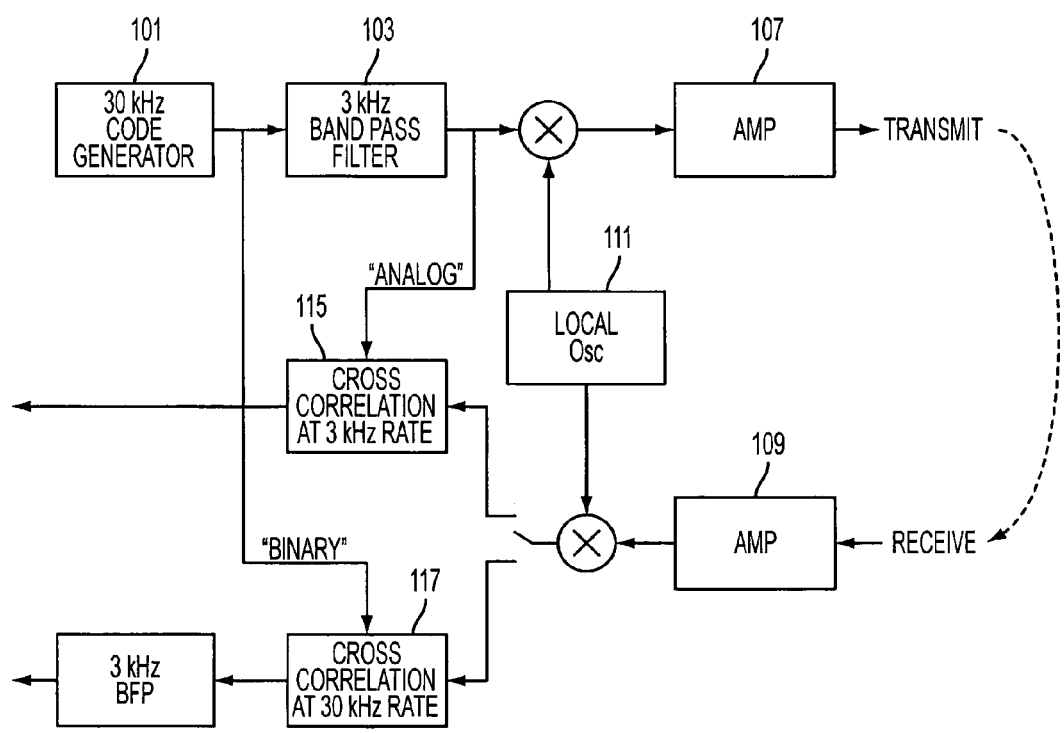
FIG. 1 shows a simplified block diagram of an embodiment of a sonar apparatus for transmitting, receiving and analyzing a modulated sonar pulse.

An embodiment as depicted in FIG. 1 generally operates as follows. A code generator 101 produces a pulse sequence at 800 kHz, preferably with the desired complementary properties. The pulse sequence is then passed through a bandpass filter 103 that limits the frequency bandwidth of the pulses to 80 kHz, thereby modifying the pulse sequence by changing the pulse shape and increasing the pulse width, particularly in the primary lobe. Because of the change in shape and width, the filtered pulses have significant interference among themselves, and no longer display any observable regularity. This irregular output from the bandpass filter 103 is a baseband signal that is then used to modulate a carrier wave generated by a local oscillator 111. The modulated carrier wave is then amplified in amplifier 107 before transmission from a transducer.

After reflection from an object some distance from the sonar transmission apparatus, a return signal pulse, received either by the transmitting transducer or an adjacent transducer, is amplified by amplifier 109, mixed with the signal from the local oscillator 11 1, and then processed by cross correlation 115 with the baseband output of the bandpass filter 103, or by an alternative cross correlation 117 with the pulse sequence output of the code generator 101. A person of ordinary skill in the art understands that FIG. 1 provides a simplified depiction of the steps of transmission and signal processing, and also understands how to perform the necessary transmission, processing, and analysis generally described herein.

In a preferred embodiment, the code generator 101 generates a binary sequence that consists of a set of complementary sequences, wherein the number of sequences in a set may be a number greater than or equal to one. Complementary sequences (including sequence sets) are those for which the sum of the auto-correlation functions for each of the sequences of the set yields minimal side lobes and is represented predominantly by a single peak. Many choices exist for code sequences that exhibit such desirable properties for favorable sonar performance in an embodiment of the present invention, some of which are readily available in the literature, including Golay, Hadamard, and Barker codes. A more preferred embodiment uses a binary code that is a complementary Welti-D sequence. Where a complementary sequence set is utilized, the particular sequence within the set that is used to generate the baseband may be selected in either a regular or random pattern from among the sequences in the set.

The use of a complementary sequence, however, is not critical to the feature suppression described here. Rather, the use of a complementary sequence provides a benefit by reducing from the processed return signal the presence of false targets caused by time sidelobes. So, while a random sequence could be used to generate a suppressed feature active sonar system, such a choice will increase the likelihood of false targets due to the poorer auto-correlation properties of a random sequence as compared with a complementary sequence, such as those presented above.

Figure 2A:
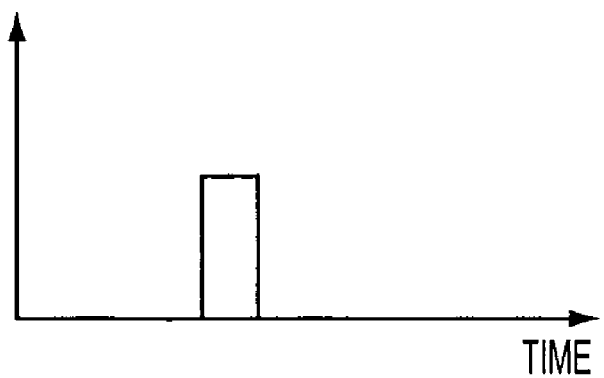
FIG. 2A shows a single square wave pulse of an embodiment of a pulse sequence used to generate a baseband waveform.
Figure 2B:
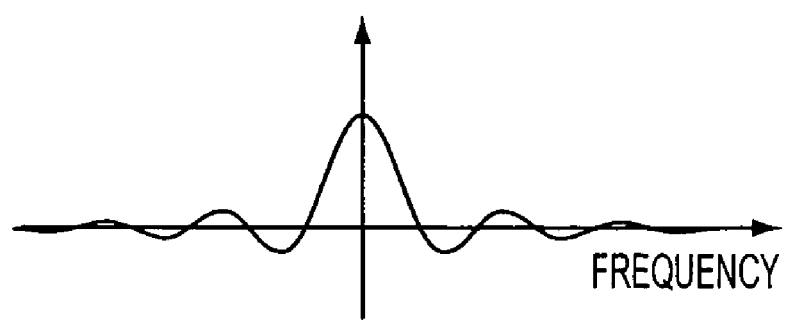
FIG. 2B shows the Fourier transform of the square wave pulse of FIG. 2A.

FIGS. 2-3 illustrate the generation of the modulating baseband waveform. In FIG. 2A, a single pulse of the pulse sequence, which could be digital or analog, is represented by an ideal square wave pulse in the time domain. Through Fourier transform, the frequency spectrum of the square wave pulse is obtained, as represented by the function sin(x)/x, shown in FIG. 2B. As is known to one of ordinary skill in the art, because this frequency spectrum (defined by sin(x)/x) shows a contribution from an infinite span of frequencies, an infinite frequency bandwidth would be required to transmit such an ideal square wave pulse. Also known to one of ordinary skill in the art, an inverse Fourier transform of a limited-span frequency spectrum waveform, produces a time domain response of infinite duration. For example, when the frequency spectrum is represented by a single square wave, the result of an inverse Fourier transform is represented by the sin(x)/x function, which, in this instance, is infinitely long in the time domain.

Figure 3A:
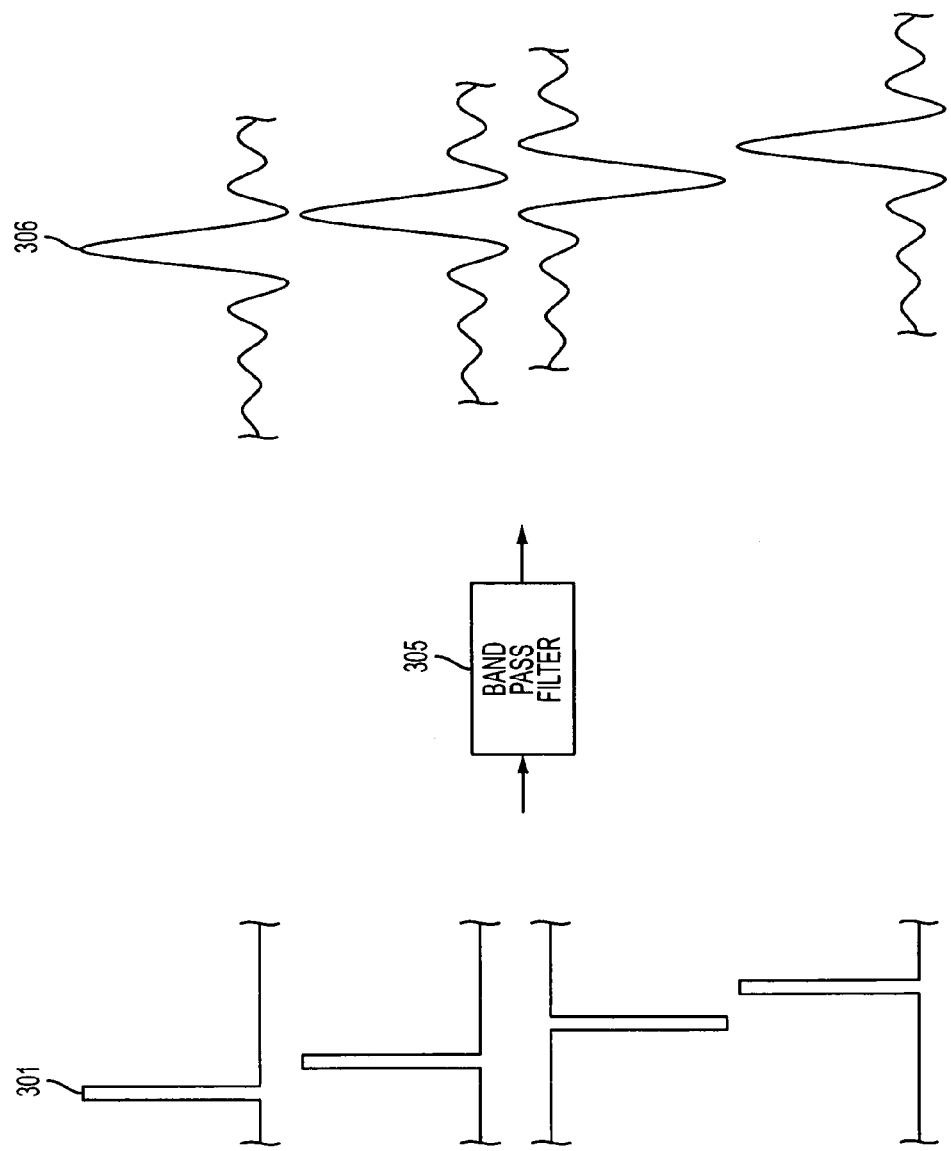
FIG. 3A shows a spatial decomposition of a four-pulse sequence and the constituent waveforms (having a single primary lobe) generated by individually passing these pulses through a bandpass filter.
Figure 3B:
FIG. 3B shows the four pulse sequence of FIG. 3A and the baseband waveform resulting from the interference created among primary lobes of the constituent waveforms when passing this pulse sequence through a bandpass filter.
Figure 3B:
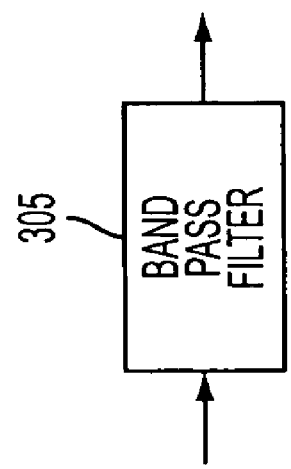
Figure 3B:
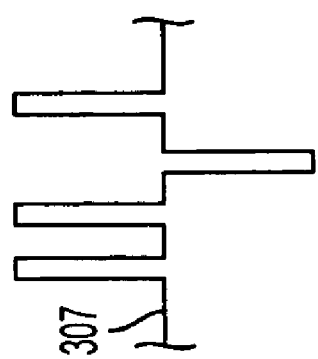

So it is that by passing a time limited pulse through a bandpass filter to purposefully limit the frequency bandwidth, the pulse shape is changed. FIG. 3 illustrates how the bandpass filtering operation effects a pulse sequence comprised of a series of individual pulses, such as is used to generate the baseband waveform in an embodiment of the present invention. In FIG. 3A, a brief series of only four square wave pulses of a pulse sequence have been spatially separated to simplify the illustration of the effect of a bandpass filter 305 on each individual pulse. Considering a single square wave pulse 301 (being time limited and having contributions from an infinite number of frequencies) it is observed that after being passed through a bandpass filter 305 (which limits the frequency components of the pulse) the pulse is altered to become an infinitely long wave in the time domain. The filtered wave comprises a main lobe 306 (or primary lobe 306) and many smaller lobes, known as side lobes. Viewed in combination, FIGS. 3A and 3B depict that where the frequency of the pulse sequence 307 entering the bandpass filter is sufficiently high compared with the bandwidth passed by the filter 305, the filtered pulses have a main lobe width sufficiently wide that the main lobes of adjacent pulses interfere. As shown in FIG. 3B, due to this interference, the filtered pulse stream (the baseband waveform) 309 appears to be lacking any regularity. In effect, the baseband waveform 309 appears as noise. Thus, by overdriving the bandpass filter 305, the periodicity of the pulse sequence 307 has been suppressed to a point that it is unrecognizable.

For feature suppression as described here to operate sufficiently to defeat a square law detector, it is only necessary that the frequency of the pulse sequence 307 be at least twice the bandwidth of the filter 305. While a pulse sequence frequency that is twice the bandwidth of the pulse shaping filter 305 will make a sonar more difficult to detect, a preferred embodiment has a pulse sequence frequency that is about eight to about ten times the filter bandwidth, which will thereby defeat higher order nth law detectors.

The baseband waveform generated by overdriving the bandpass filter 305, a baseband waveform that appears to be just noise, now may be used to modulate a carrier wave. The modulated carrier wave then has an internal structure lacking any apparent regularity. The sonar transmission so produced resembles a sequence of pulses for which there is no substructure, and which contain only noise. Feature detectors not associated with the code generator 101 are unable to decode the noise, and therefore unable to detect any internal structure. To such a detector not associated with the transmitter, the sonar transmission is unrecognizable. Therefore, the transmitter of such a sonar comprising a virtual noise modulation becomes a stealth transmitter, at least to any feature detector not associated with the transmission apparatus.

As mentioned above, the modulated carrier wave can be further altered prior to transmission in attempts to conceal the presence of the modulated carrier wave sonar pulse altogether, so as to avoid detection by classic carrier wave frequency detectors. Such alterations include traditional power management, frequency diversification, directivity of transducer array and tactical techniques. Additional filtering and attenuation of a carrier wave modulated by a virtual noise baseband waveform can aid in the already suppressed carrier frequency being nearly undetectable, and in this way the sonar transmission apparatus is truly stealthy.

A practical application for a sonar using a suppressed feature waveform that illustrates just one of many varied applications where an embodiment of this invention would be beneficial is use in hunting shallow-water mines. Operationally, in a mine hunting scenario, a vessel (e.g., a ship or a submarine) would prefer to detect a mine that is generally ahead on bearing before the mine becomes a danger to the ship. Additionally, if the vessel is on a covert mission (which is more common for a submarine), it would prefer to detect a mine without transmitting a signal that might alert an adversary to the vessel's presence. Thus it is that covert operations give rise to the need for stealth, which can be a benefit provided by some embodiments of this invention.

A traditional mine hunting sonar is hull-mounted on a ship, a submarine, or a remotely operated vehicle. The transducer array of such a sonar surveys a wide arc of coverage centered ahead of bearing. Because classification of mine-like objects is difficult, particularly for bottom- or close-tethered mines, due to the high discrete reverberation (clutter) from the sea bed, high resolution, both in range and angle, is needed to discriminate a target from the clutter. For high angle resolution, large arrays and high carrier frequencies are used. For high range resolution, short pulse lengths (actual or compressed) are required. Traditional mine-hunting sonar typically uses a continuous wave pulse of much less than 1 mS duration, or a broadband LFM pulse. In the case of the LFM pulse, the actual pulse length can be much longer, but then it is generally compressed through signal processing upon reception of the return signal. Such a process allows a lowering of the transducer power level, while enabling a widening of the bandwidth of the transmitted signal. A LFM pulse with 80 kHz bandwidth signal and an actual pulse width of 10 ms will compress to a pulse length of 12.5 µS, yielding a range resolution of less than 1 inch. A traditional mine hunting sonar would modulate this LFM pulse on a 200 kHz carrier. The LFM pulse would repeat at a rate of 2.5 pulses per second, supporting a maximum range of 300 meters.

While the traditional LFM design discussed above will detect mines, its waveform is easily detectable by an adversary. To reduce the likelihood of being detected by an adversary, a feature suppressed waveform can be designed using the same primary design parameters as the traditional mine-hunting sonar in order to gather essentially equivalent information. The design parameters of interest in this example, and those that should be mimicked with a suppressed feature sonar are the following: carrier frequency (200 kHz); bandwidth (80 kHz); actual pulse width (10 ms); compressed pulse width (12.5 µS); pulse repetition rate (2.5 pulses/sec).

The suppressed feature mine hunting sonar of this example comprises a binary code generator generating an 8192 length complementary sequence at an 800 kHz rate (i.e., ten times the desired bandwidth). A bandpass filter filters this sequence to an 80 kHz bandwidth. The resulting 10 ms noise-like waveform is up-converted to a (suppressed) 200 kHz carrier. The same pulse repetition and transducer array as the traditional LFM mine hunting sonar is utilized. As described above, upon receiving an echo from a target, the processor cross-correlates the echo return signal with the internal reference signal. The resulting compressed pulse width is 12.5 µS, yielding a range resolution of less than 1 inch.

Both of these sonars, the traditional LFM and the suppressed feature design, have the same performance, i.e., a range resolution of less than 1 inch, a 300-meter maximum range, and identical angular resolution (due to the same carrier frequency and transducer array). The suppressed feature design is far less detectable by an adversary than the traditional LFM design, however, since the features of the pulse substructure are suppressed.

Additional examples of applications in which an embodiment of the invention may be used include sonars for fire control targeting and for covert navigation. Beyond the stated examples, quite a large variety of sonar applications may benefit from use of an embodiment of this invention, particularly where the user has a strong desire not to have the sonar signal detected.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method of producing a suppressed feature waveform sonar transmission signal, said method comprising:
    modifying a pulse sequence waveform by passing said pulse sequence waveform through a bandpass filter to generate a baseband waveform, said baseband waveform resulting from interference between primary lobes of the modified pulse sequence waveform; and
    modulating a carrier wave with said baseband waveform to produce the suppressed feature waveform sonar transmission signal.

2. The method of claim 1 wherein said baseband waveform resembles noise.

3. The method of claim 1 wherein said pulse sequence waveform is generated from a pulse sequence that is selected from one of a complementary pulse sequence, a Golay sequence, a Hadamard sequence, a Barker sequence, or a Welti sequence.

4. The method of claim 3 wherein said pulse sequence is a set of two or more sequences, from which a number of members of said set are selected and used independently to generate an equal number of baseband waveforms that are used in either a defined or a pseudo-random order to successively modulate portions of said carrier wave.

5. The method of claim 1 wherein said pulse sequence waveform is generated from a pulse sequence that manifests a complementary property; and wherein said baseband waveform retains said complementary property of said pulse sequence.

6. The method of claim 1 wherein said interference is the result of a broadening of the pulse width of the pulses in said pulse sequence waveform.

7. The method of claim 1 wherein said interference between primary lobes is generated when said pulse sequence waveform is passed through a bandpass filter.

8. The method of claim 7 wherein said pulse sequence waveform is characterized by a frequency that is at least twice the value of the bandwidth passed by said bandpass filter.

9. The method of claim 8 wherein said pulse sequence waveform is characterized by a frequency that is in the range from about eight to about ten times the value of the bandwidth passed by said bandpass filter.

10. The suppressed method of claim 1 wherein said modulation of said carrier wave with said baseband waveform is essentially undetectable by a detector that is not provided with at least one of said pulse sequence waveform, said pulse sequence from which said pulse sequence waveform was generated, or said baseband waveform.

11. The method of claim 1 wherein said modulated carrier wave is further altered by at least one of the following techniques: power management, frequency diversification, directivity selection, or tactical techniques.

* * * * *